Feb. 15, 1955     A. G. CARTER ET AL     2,701,971
WHEEL ASSEMBLY
Filed April 1, 1950
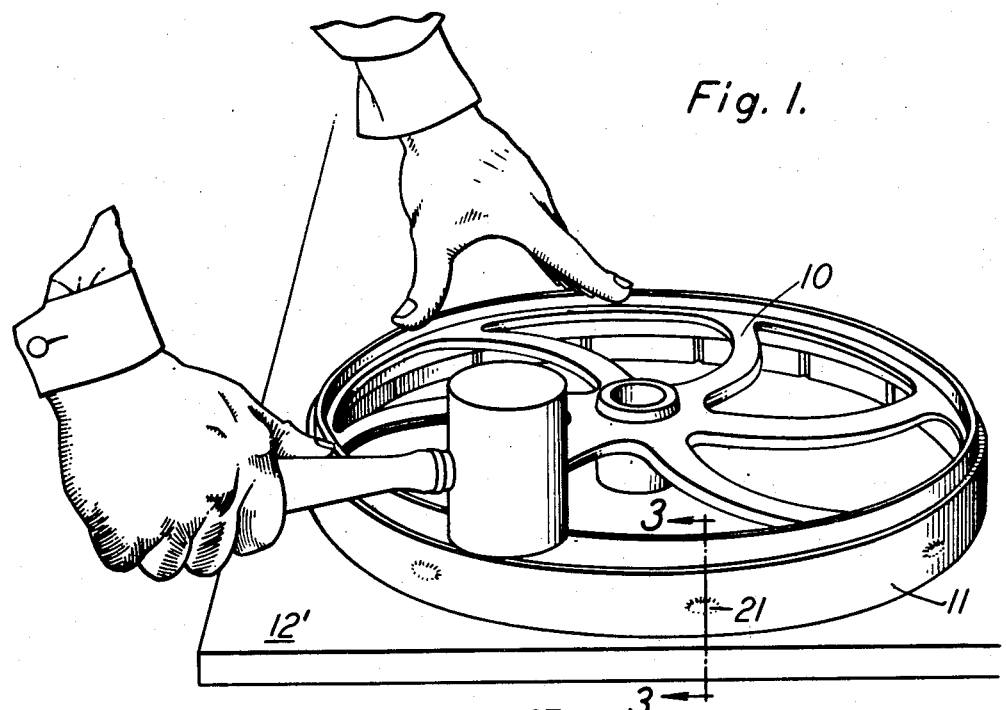
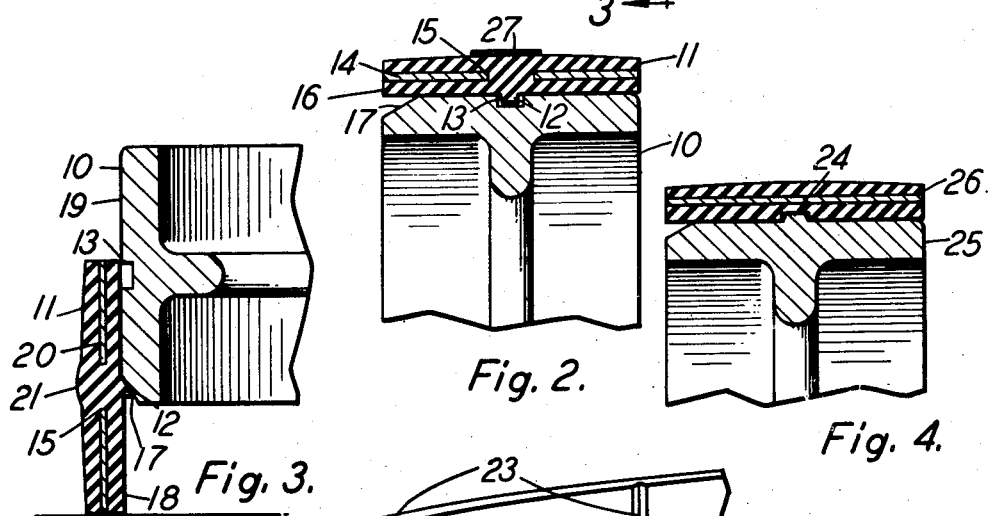
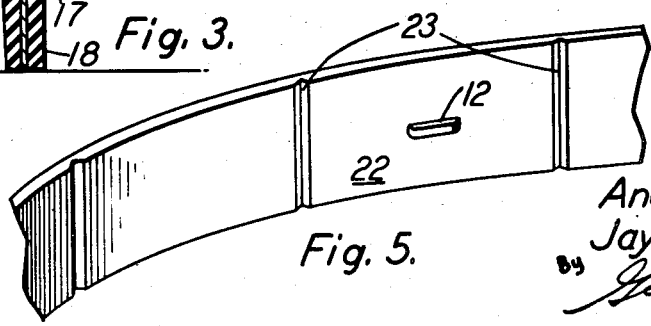
Inventors
Andrew G. Carter
Jay A. Caswell
Attorney

United States Patent Office 2,701,971
Patented Feb. 15, 1955

2,701,971

WHEEL ASSEMBLY

Andrew Gray Carter, Grand Rapids, and Jay A. Caswell, Rockford, Mich.

Application April 1, 1950, Serial No. 153,456

1 Claim. (Cl. 74—230.7)

The present invention provides a wheel assembly including a frame and a "tire," and is particularly concerned with the attachment of the tire to the frame to secure it against axial displacement. This application is related to the application of Andrew G. Carter Serial Number 26,787 filed in the United States Patent Office on May 13, 1948, which has issued as Patent No. 2,673,469, dated March 30, 1954.

These devices find their principal utility in band-saw wheels in which the strength and rigidity of metal is required while maintaining particular surface characteristics which are unobtainable with metal. The endless strip of material from which the saw is made must be carried upon a surface which is somewhat resilient so as to give uniform tension and permit the configuration of the teeth of the saw to be properly carried around the wheel without undue distortion or wear. In the past it has been the usual practice to cement a strip of rubber around a metal frame in order to give these characteristics; but as pointed out in the above-noted application, there are several objections to this type of assembly. A high rotational speed coupled with a large wheel diameter generates enough centrifugal force so that any failure of the adhesive would immediately result in a section of the tire leaving the frame with obviously undesirable consequences. It has also been the experience of manufacturers of these wheels that it is extremely difficult to obtain absolute uniformity in thickness of the adhesive about the periphery of the wheel, and as a result it becomes necessary to balance the assembly after the assembly of the tire. Removal and reinstallation of another tire distorts the balance of the assembly and requires considerable further work to be done before the machine is in its original condition.

United States Patents 1,914,487; 1,898,031; 1,811,916; 1,765,403; 1,765,402; and 1,593,751, together with the above noted application, illustrate and describe a band-saw tire construction involving a rubber-like material having a metal core formed in a continuous strip. This core transmits circumferential tension, and resists any tendency of centrifugal force to throw the tire or parts of it away from the frame. The various patents and the application noted above are generally concerned with methods of attaching this peripheral surface member to the frame, the application showing a form in which a yieldable member associated with the tire snaps into engagement with a suitable retaining groove on the frame to prevent axial displacement of the tire under operating conditions. The present application is a continuation in part of that application, and is principally concerned with a particular type of engaging member.

*Summary of the features of the preferred form of the present invention*

The inventors disclose and claim herein a system for locating a band-saw tire upon a wheel frame by the cooperation of a molded projection of the rubber-like material with a suitable groove or recess in the wheel frame. The preferred material for the formation of the tire includes a steel core and a rubber body, and the mold in which this unit is made is provided with recesses causing the formation of a radially inwardly projecting series of members upon the inner surface of the tire which are forced radially outward during the process of the assembly of the tire to the frame. To accommodate the deformation and the consequent local flow of material so as to more readily permit this assembly, the core member is formed with an aperture of substantial size directly opposite the inwardly extending locating member so that force applied to the locating member in an outward direction causes a flow of the rubber material outwardly through the aperture thereby permitting the tire to be slid axially into position without a substantial tendency to tear the projections.

The combination of the tension-transmitting core member and the rubber body of the tire permits the use of a diameter relationship between the outer surface of the frame and the inner surface of the tire such that a force fit results. As the tire is forced into position, a considerable amount of flow of the rubber material of the body of the tire takes place as it is squeezed both in an axial and a peripheral direction. The inner surface of the tire (from the inner diameter to the core) is preferably broken up into a series of pads so separated that circumferential flow of the material to a limited degree can take place under the squeezing action generated by the forcing of the tire into position on the wheel. At least one edge of the wheel frame is preferably beveled to guide the tire into position, and the process of assembly can be performed by laying the tire upon a suitable flat surface and tapping the wheel into position with the use of a hand hammer. The removal of a tire for replacement (for the effects of wear or damage) is accomplished by applying a hack-saw in an axial direction and cutting the metal core member. The release of the tension provided by the core member of course permits the tire to be slid easily from position. The absence of any adhesive material in the preferred form of the invention considerably facilitates the replacement process.

It has been found that the use of a diameter ratio between the tire and the frame causing a force fit results in the maintenance of the material between the frame and the core in a compressed condition and results in the exact location of the entire body of the tire in position around the frame without the possibility of eccentricity as would be the case if even a minute amount of looseness were present permitting the tire to be forced radially outward from the frame as the wheel is brought up to speed. The circumferential tension of the core forcing the material of the tire firmly into engagement with the frame also generates a tremendous amount of friction tending to hold the tire in place both circumferentially and axially, and permits a comparatively low-strength locating system to be used such as the rubber projections outlined above. It has even been found practical to rely entirely upon the friction generated in the inner surface of the tire and dispense with the use of the locating projections, particularly when the surface of the frame is somewhat roughened (particularly in an annular direction).

*Modifications of the present invention*

While the above assembly has been outlined as the preferred form of the invention, several alternatives are possible which have been found to have fewer of the desirable characteristics but still contain several of the valuable features not to be found in the prior art. For instance, it has been found practical to form the frame of the wheel with an annular ridge in its outer periphery for cooperation with a molded groove in the tire. The edge of the ridge is preferably beveled, and the tire can be forced into position by deformation of the material of the body of the tire sufficient to permit the axial passage of the ridge to the point where it reaches cooperating position with the molded groove.

While the use of cement is not preferred, in some installations it may be utilized in place of the mechanical axial locating system outlined above. The use of cement generates much less of a problem when utilized with the present invention in which a diameter interference exists between the inner diameter of the tire and the outer diameter of the frame. This condition prevents the building up of excessive thicknesses of the cementing material so that an unbalanced condition is created. With the use of the tension-transmitting core member, the function of the cement becomes entirely one of preventing axial displacement and does not carry with it the possibility that a failure of the cement joint might throw a section of the tire member radially outward.

As another alternative for the axial locating system, it has been found practical to form the periphery of the frame with a roughened surface, such as would result from a rather coarse cut on the periphery of the frame with a lathe tool. These substantially annular (actually helical) grooves closely cooperate with the material of the body of the tire under the constricting tendency of the core member so that a relatively secure positioning effect is obtained.

*Discussion of the embodiments illustrated in the drawings*

The several features of the present invention will be discussed in detail by an analysis of the particular embodiments illustrated in the accompanying drawings. In these drawings:

Figure 1 is a perspective view showing the manner of installation and the assembly of the tire member to the wheel frame.

Figure 2 is a section taken parallel to the axis of the wheel after the tire is in the assembled position.

Figure 3 is a section taken on the plane 3—3 of Figure 1.

Figure 4 is a section showing a modified form of the present invention.

Figure 5 is a perspective view showing a broken away section of the inner surface of a tire embodying the present invention, shown on an enlarged scale.

Referring to Figures 1, 2, and 3, a wheel assembly is shown comprising a frame 10 and a tire 11. The assembly of the tire to the wheel is accomplished in the manner indicated in Figure 1 in which the tire 11 is placed upon the table 12', and the frame 10 laid in a position which is coaxial with the tire. The application of hammer blows around the outer edge of the frame 10 will cause relative axial movement between the tire and frame so that the completely assembled relationship indicated in Figure 2 is finally reached. The axial location of the tire 11 with respect to the frame 10 is rendered positive by the engagement of the radially inwardly projecting members 12 with the annular groove 13 in the frame 10. The tension-transmitting core member (usually of steel) 14 is provided with the apertures 15 permitting a limited flow of the rubber-like material 16 of the body of the tire in a radially outward direction as is indicated in Figure 3 during the assembly of the tire. The frame 10 is preferably formed with a bevel 17 to facilitate the assembly.

The inner diameter 18 of the tire member 11 is preferably somewhat less than the outer diameter 19 of the frame. As the tire is forced into the assembled position, the material between the inner diameter 20 of the core member 14 and the outer diameter 19 of the frame is compressed resulting in a predominately axial displacement of the material which is permanently maintained. The resilience of the rubber causes this condition to generate a continuous outward load resisted by the circumferential tension of the core member 14. These two effects combine to produce a firm and dependable mounting for the tire member having a natural tendency to eliminate all eccentricity. It will be noted that the assembly of the tire to the wheel causing the material of the body of the tire to be forced outwardly through the apertures 15 will temporarily generate the bumps 21 which will persist until the projections 12 reach their cooperating position with the groove 13.

The preferred amount of interference between tire and frame is set forth in the following table in which corresponding inside diameter ("I. D.") of tires and outside ("O. D.") of wheel frames are listed.

| I. D., Tire | O. D., Wheel |
|---|---|
| 11.562 | 11.593 |
| 13.562 | 13.596 |
| 15.562 | 15.599 |
| 15.813 | 15.853 |
| 17.562 | 17.602 |
| 19.562 | 19.605 |
| 23.437 | 23.483 |
| 25.437 | 25.486 |
| 27.437 | 27.489 |
| 29.437 | 29.492 |
| 31.437 | 31.495 |
| 33.437 | 33.497 |
| 35.437 | 35.499 |
| 37.437 | 37.501 |

Referring to Figure 5, it will be noted that the projections 12 are preferably not continuous around the entire inner surface but are formed as isolated members. The inner diameter of the tire is preferably broken up into a series of pads 22 separated by the molding points 23. The process of the molding of the tire members involves the support of the core member upon the components of the die which are shaped to form the configuration at the points 23.

A modified form of the present invention is indicated in Figure 4, which involves a projecting member 24 formed integrally with the frame 25, and which may be either annular or composed of a series of individual projections. The assembly of the tire member 26 is accompanied by the local deformation of the body material of the tire between the inner diameter of the core and the outer diameter of the projections 24. The edges of the projections 24 are preferably beveled as shown to facilitate such deformation. In both the forms illustrated, it will be noted that the strip of metal 27 forming the band-saw operates directly opposite the components of the locating system in such a manner that the tension applied to this band has a tendency to firmly urge the locating system into cooperating engagement.

The particular embodiments of the present invention which have been illustrated in the accompanying drawings and discussed herein are for illustrative purposes only and are not to be considered as a limitation upon the scope of the appended claim. In this claim it is the intent of the inventors to claim the entire invention to the extent to which they are entitled in view of the prior art.

We claim:

A wheel assembly comprising a rim having a substantially cylindrical peripheral surface provided with a circumferentially extending groove intermediate the sides thereof, and a resilient tire embracing said peripheral surface, said tire having a substantially annular, relatively inextensible core embedded in resilient plastic deformable material, said core being under circumferential tension when the tire is mounted on the rim, a portion of said plastic material being deformed radially inwardly into said groove by forces imposed by the tension of said core.

References Cited in the file of this patent

UNITED STATES PATENTS

| | | |
|---|---|---|
| 300,782 | Koch | June 24, 1884 |
| 1,456,458 | Nordell | May 22, 1923 |
| 1,576,924 | Malloy | Mar. 16, 1926 |
| 1,838,164 | Tannewitz | Dec. 29, 1931 |
| 2,369,635 | Bacon | Feb. 20, 1945 |
| 2,597,858 | Freedlander | May 27, 1952 |